United States Patent [19]

Pecoraro et al.

[11] Patent Number: 4,919,700
[45] Date of Patent: Apr. 24, 1990

[54] VACUUM REFINING OF GLASSY MATERIALS WITH SELECTED WATER CONTENT

[75] Inventors: George A. Pecoraro, Lower Burrell; Larry J. Shelestak, Bairdford; Joseph E. Cooper, Natrona Heights, all of Pa.

[73] Assignee: PPG Industries, Inc., Pittsburgh, Pa.

[21] Appl. No.: 292,718

[22] Filed: Jan. 3, 1989

[51] Int. Cl.[5] .................................... C03B 5/225
[52] U.S. Cl. ................................. 65/134; 65/135; 65/136
[58] Field of Search ............... 65/32.5, 135, 34, 136, 65/374.12, 346, 347

[56] References Cited

U.S. PATENT DOCUMENTS

| | | |
|---|---|---|
| 805,139 | 11/1905 | Hitchcock . |
| 1,564,235 | 12/1925 | Harrington . |
| 1,598,308 | 8/1926 | Pike . |
| 2,331,052 | 10/1943 | Shadduck . |
| 2,781,411 | 2/1957 | Geffcken et al. ............ 13/31 |
| 2,877,280 | 3/1959 | Eden ............................ 13/6 |
| 3,338,694 | 8/1967 | Davy ............................ 65/32 |
| 3,429,684 | 2/1969 | Plumat ......................... 65/335 |
| 3,442,622 | 5/1969 | Monnier et al. ............ 23/223.5 |
| 3,519,412 | 7/1970 | Olink ........................... 65/337 |
| 3,606,825 | 9/1971 | Johnson ...................... 65/136 |
| 3,617,231 | 11/1971 | Fenstermacher ........... 65/134 |
| 3,753,743 | 8/1973 | Kakuda et al. ............. 65/32.5 |
| 4,195,982 | 4/1980 | Coucoulas et al. ........ 65/134 |
| 4,381,934 | 5/1983 | Kunkle et al. ............. 65/135 |
| 4,539,034 | 9/1985 | Hanneken ................... 65/134 |
| 4,545,800 | 10/1985 | Won et al. .................. 65/134 |
| 4,738,938 | 4/1988 | Kunkle et al. ............. 501/72 |

FOREIGN PATENT DOCUMENTS 948301  1/1964  United Kingdom ........... 65/32.5

Primary Examiner—Joye L. Woodard
Attorney, Agent, or Firm—Dennis G. Millman

[57] ABSTRACT

In a method of vacuum refining molten glass or the like, sufficient concentration of water is provided in the molten material so as to cause enhanced foaming.

10 Claims, 1 Drawing Sheet

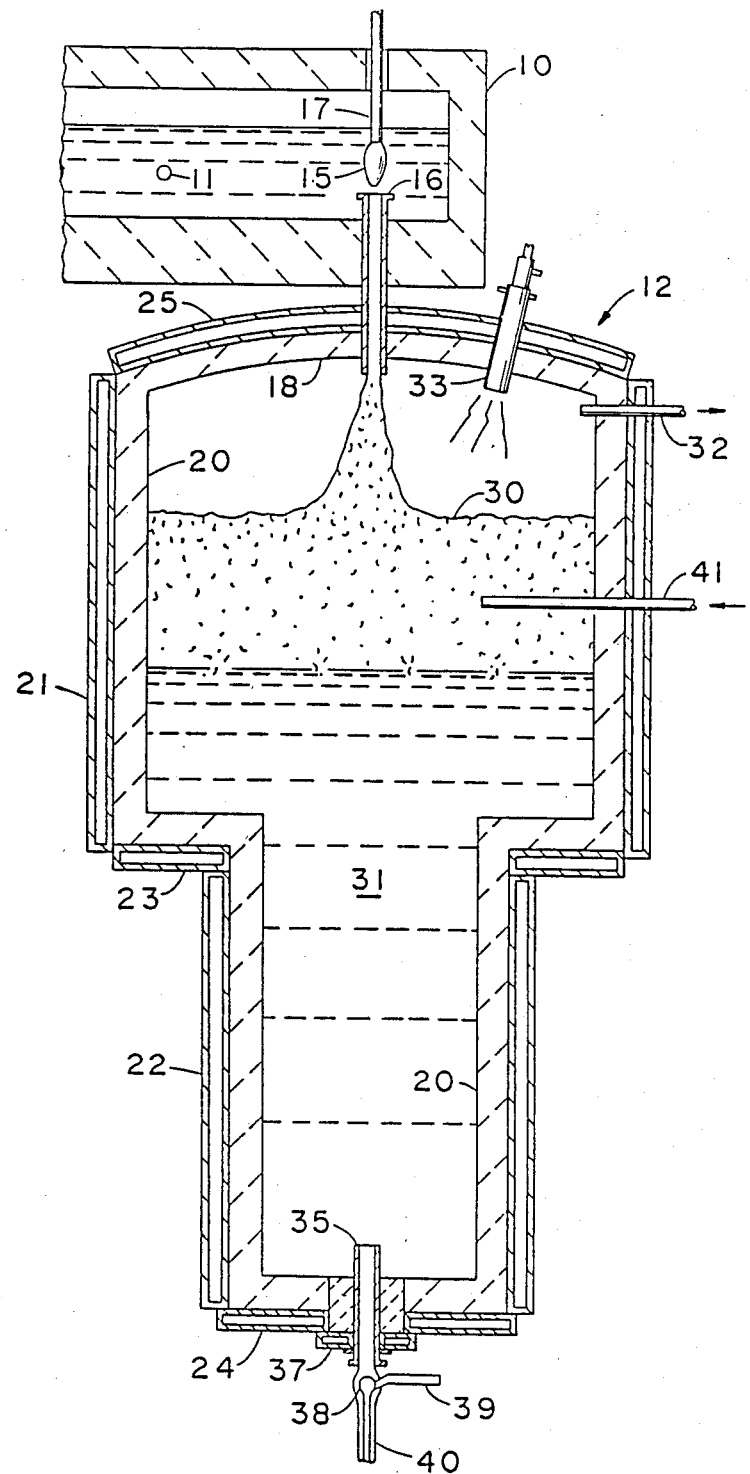

3

VACUUM REFINING OF GLASSY MATERIALS WITH SELECTED WATER CONTENT

BACKGROUND OF THE INVENTION

The present invention relates to the use of subatmospheric pressure to expedite refining of molten glass or the like. More particularly, the invention relates to enhancement of the foaming in such a refining technique to yield improved refining.

In the melting of glass, substantial quantities of gas are produced as a result of decomposition of batch materials. Other gases are physically entrained by the batch materials or are introduced into the melting glass from combustion heat sources. Most of the gas escapes during the initial phase of melting, but some becomes entrapped in the melt. Some of the trapped gas dissolves in the glass, but other portions form discrete gaseous inclusions known as bubbles or "seeds" which would be objectionable if permitted to remain in unduly high concentrations in the product glass. The gas inclusions will rise to the surface and escape from the melt if given sufficient time in the stage of a melting operation known as "refining" or "fining." High temperatures are conventionally provided in the refining zone to expedite the rise and escape of the gaseous inclusions by reducing the viscosity of the melt and by enlarging the bubble diameters. The energy required for the high temperatures employed in the refining stage and the large melting vessel required to provide sufficient residence time for the gaseous inclusions to escape from the melt are major expenses of a glassmaking operation. Accordingly, it would be desirable to assist the refining process to reduce these costs.

It has been known that reduced pressure could assist the refining process by reducing the partial pressure of the included gaseous species and by increasing the volume of bubbles within the melt so as to speed their rise to the surface. The impracticality of providing a gas-tight vessel on the scale of a conventional refining chamber so as to draw a vacuum therein has limited the use of vacuum refining to relatively small scale batch operations such as disclosed in U.S. Pat. Nos. 1,564,235; 2,781,411; 2,877,280; 3,338,694; and 3,442,622.

Continuous vacuum refining processes have been proposed but have not found acceptance for large scale, continuous manufacture of glass due to various drawbacks. In the continuous vacuum refining arrangements shown in U.S. Pat. Nos. 805,139; 1,598,308; and 3,519,412 a disadvantage is the requirement for relatively narrow vertical passageways leading into and out of the vacuum zone necessitated by the pressure difference. Also, the molten glass is not fully exposed to the vacuum since the incoming glass enters from below a pool of glass.

A different arrangement is shown in U.S. Pat. No. 3,429,684, wherein batch materials are fed through a vacuum lock and melted at the top of a vertically elongated vacuum chamber. Melting raw materials within the vacuum chamber is a disadvantage of that arrangement for three reasons. First, large volumes of foam would be created by carrying out the initial decomposition of the raw materials under vacuum, which would require a vessel large enough to contain the foam. Second, there is a danger that raw materials may follow a short circulation path to the output stream, thus avoiding adequate melting and refining. Third, carrying out the initial stages of melting and heating the melt to a refining temperature within the vacuum vessel require large amounts of heat to be supplied to the melt within the vessel. Such a major heat input to the vessel inherently induces convection currents within the melt that increase erosion of the walls, which leads to contamination of the refined product stream.

U.S. Pat. No. 4,195,982 discloses initially melting glass under elevated pressure and then refining the glass in a separate chamber at a lower pressure. Both chambers are heated.

A preferred technique for vacuum refining glass is disclosed in U.S. Pat. No. 4,738,938 (Kunkle et al.) wherein the creation of foam is deliberately enhanced by introducing the molten glass into the vacuum chamber above the level of the molten glass held therein. Excessive foam was indicated in that patent as being a problem to be avoided. A large space above the liquid container must be provided to accommodate the foam if a large throughput is desired. Since this headspace must also be maintained gas-tight, its construction can be a significant economic drawback, particularly on a large scale process. As a result, the volume of foam acts as a limiting factor to the throughput rate and/or the degree of vacuum that can be utilized.

One measure for maintaining reasonable foam volume that is disclosed in U.S. Pat. No. 4,738,938 is to minimize and, preferably, to eliminate the presence of sulfur, generally present in the form of $SO_3$, in the molten glass entering the vacuum chamber. The use of sulfur compounds is common in the glassmaking art as melting and refining aids. But in the vacuum refining technique of the aforesaid patent, the inclusion of sulfur compounds was disclosed to be unnecessary and to be a major source of unwanted foam. Excessive foam generation can result if the molten glass contains sulfur refining aids on the order typically provided in conventional melting and refining operations. Following the teachings of addition of refining aids such as sulfur compounds has been eliminated, and refining has generally been adequate. However, on some occasions, for reasons that were previously not understood, periods of inadequate removal of gaseous seeds from the glass occurred, even though the glass entering the vacuum refiner was very low in gas content and low pressures were used.

U.S. Pat. No. 2,331,052 (Shadduck) discloses bubbling steam through molten glass to refine the glass by sweeping out other gases.

U.S. Pat. No. 3,617,231 (Fenstermacher) discloses increasing the water content of the product glass in order to alter its softening point. Water concentrations of the product glass a high as 0.066 percent by weight are disclosed.

U.S. Pat. No. 3,606,825 (Johnson) uses submerged combustion of methane with oxygen to melt glass. Although the chief product of combustion would be water, the patent expresses no interest in increasing the water content of the glass, only avoiding the introduction of nitrogen bubbles. A similar use of oxygen fired submerged combustion is disclosed in U.S. Pat. Nos. 4,545,800 (Won et al.) and 4,539,034 (Hanneken).

SUMMARY OF THE INVENTION

The present invention is based on the surprising discovery that when refining glass or the like by vacuum, glass having a low concentration of gases when entering the vacuum chamber may be refined less adequately by the vacuum than glass having a higher gas content. This finding is contrary to expectations since it would seem that removal of gases would be easiest with the glass having the lowest gas content. But is is now theorized that the thoroughness of the refining is dependent upon the degree of volume expansion produced by the foaming of the melt as it enters the vacuum chamber. The volume expansion of the foam is, in turn, a function of the concentration of relatively volatile substances in the molten glass which enter the gas phase with the reduced pressure of the vacuum chamber. Therefore, even though removal of volatile substances is the overall objective of refining, it appears that the presence of certain amounts of these substances is beneficial to act as foaming agents. At the same time, accumulation of undue amounts of foam within the chamber remains a problem.

The expansion of dissolved and entrained gases as the melt encounters the reduced pressure of the vacuum chamber is advantageously of such a magnitude to render substantially all of the liquid into the membrane walls of the foam structure. Stretching of the membrane walls by further expansion is also desirable because it reduces the thickness of the membranes, which is believed to reduce the size of the largest gaseous seed that can exist within the membranes. Additionally, the more the foam membranes have been stretched, the more readily the foam subsequently collapses. It is an object of the present invention to provide sufficient volume expansion so as to adequately refine the glass and to rapidly collapse the foam while avoiding impractically large accumulation of foam.

It has been found that these objectives can be met by providing in the molten glass entering the vacuum chamber sufficient quantities of materials that will volatilize at the reduced pressure conditions of the vacuum chamber so as to produce adequate foaming action. In the present invention the foaming agent is water, either alone or in combination with other volatile substances. Water is normally present in small amounts in molten glass, and when the molten glass is subjected to vacuum conditions, the water will come out of solution and contribute to the volume expansion of the foaming action. What has been discovered is that by increasing the amount of water dissolved in the glass prior to refining, the expansion of the water vapor as the melt enters the vacuum refining chamber can have a significantly beneficial effect on the vacuum refining performance. Water may be used in conjunction with other volatile substances in the glass to increase the foam volume expansion, or water may partially or wholly replace substances such as sulfur that have heretofore served as foaming agents. There are several advantages for substituting water for sulfur. Like sulfur and other refining aids, water has a relatively high solubility and diffusion rate in glass and raises the vapor pressure of the melt. However, water has an even higher vapor pressure and diffusion coefficient than sulfur. The condensate collected from the vacuum chamber is merely water, rather than the acidic condensate produced by sulfur, thereby easing disposal problems and reducing equipment corrosion. Additionally water is inexpensive and easy to add to the glass. Water also serves to lower the surface tension and viscosity of the melt, whereby foaming is enhanced and bubble size is increased. Reduced viscosity also accelerates the rate of foam decay.

The water content of the molten glass entering the vacuum refining chamber can be increased in a number of ways. In a chamber upstream from the refining stage, a high partial pressure of water may be maintained in the headspace over the melt, or steam may be bubbled into the melt. In the latter case additional agitation and homogenization are side benefits. Alternatively, materials that have a relatively high concentration of water (such as caustic soda) may be used in the batch mixture or added to the melt immediately prior to the vacuum refining stage.

The present invention contemplates improving the vacuum refining by degrees with each incremental increase of the water content of the molten glass entering the vacuum refining chamber above that normally present in the glass. Typically, the water content prior to the present invention would be about 0.02 to 0.04 percent by weight. For the purposes of the present invention, the water content of the melt should be greater than 0.05 percent by weight. Particularly significant improvements are achieved at water concentrations above 0.06 percent, preferably above 0.07 percent.

Another way of expressing the invention is in terms of the amount of water extracted from the glass during vacuum refining. The difference between the water concentration of the glass entering the vacuum chamber and the glass downstream from the vacuum chamber is preferably at least about 0.035 percent by weight under typical operating conditions.

Adequate foaming action may be characterized by initial formation of a foam having at least eight times the volume of the molten glass liquid. Preferably the foam volume is at least ten times the molten glass volume, and most preferably at least fourteen times. Depending upon the space available in the vessel, foam expansion ratios on the order of twenty or more may require auxiliary means to expedite collapse of the foam in order to limit the height of the foam layer that gathers within the refining chamber.

The expansion ratio is also dependent on the pressure within the vacuum chamber and the vapor pressure of the volatile material at the particular temperature of the melt. Knowing these factors permits the concentration of volatile species required to be present in the glass to yield a desired volume expansion upon foaming to be estimated by using the ideal gas laws.

Since volatilization of the foaming agent is essential to its purpose, the concentration of water is substantially reduced in the vacuum refining chamber typically by at least forty percent, depending upon the pressure and temperature. The improvements of the present invention are attributable to the amount of water extracted from the melt during vacuum refining. The amount of water in the final product need not be affected. In typical examples, good foaming resulted when the difference in the weight percentage of water caused by the vacuum refining was at least 0.035 percent.

Water also yields benefits in initially decreasing viscosity and surface tension of the melt. As a result, foam bubbles can grow more easily so that the bubble membranes are reduced in thickness, thereby making it more difficult for small gaseous inclusions to remain undisturbed within the membrane walls. After substantial amounts of water are removed from the foam by vacuum, viscosity and surface tension are believed to increase, thereby expediting collapse of the foam.

THE DRAWING

The FIGURE is a vertical cross-section through a vacuum refining vessel in accordance with a preferred embodiment of the present invention.

DETAILED DESCRIPTION

The detailed description will be set forth in conjunction with a method and apparatus specifically adapted for melting glass and similar glassy materials, but is should be understood that the invention is applicable to the processing of other materials as well.

Although not limited thereto, the present invention is advantageously used in conjunction with a vacuum refining system disclosed in U.S. Pat. No. 4,738,938. In that application an arrangement is disclosed whereby vacuum refining may be employed in a commercial scale, continuous glass melting process in a manner that advantageously and economically overcomes the drawbacks of the prior art. Molten glass is admitted to the vacuum refining chamber only after the majority of the thermal energy required for melting has been imparted to the melt so that little or no thermal energy need by supplied to the molten material contained within the vacuum chamber. Any known arrangement may be used to melt the glass prior to the refining step, but in preferred embodiments, batch materials are first liquefied at a stage specifically adapted for that step of the process such shown in U.S. Pat. No. 4,381,934, and the liquefied material is transferred to a second stage 10, a portion of which is shown in the figure, where dissolution of solid particles is essentially completed and the temperature of the material may be raised to a temperature suitable for refining. Subsequently, the molten material is passed to the vacuum chamber 12. In that arrangement, a large portion of the gaseous by-products of melting are driven off before the material is subjected to vacuum, and the region of greatest gas evolution is separated from the refining zone, whereby materials undergoing the early stages of melting cannot become mixed with portions of the melt undergoing refining. Because most or all of the thermal requirement for melting has been satisfied before the material enters the vacuum refining stage, and heating of the refining stage can therefore be substantially avoided, excessive convection of the melt in the refining zone can be avoided. As a result, vessel erosion is reduced, and the probability of incompletely refined portions of the melt becoming mixed with more refined portions is reduced. The short residence time of the melting material in the heated area of this arrangement is also advantageous for the sake of retaining volatile refining aids dissolved in the melt so that they can be utilized at the downstream refining zone.

It is preferred to heat the material in the final stage of the melting process (e.g., vessel 10) so as to raise its temperature in preparation for the refining stage to follow. Maximizing the temperature for refining is advantageous for the sake of reducing glass viscosity and increasing vapor pressure of included gases. Typically a temperature of about 2800° F. (1520° C.) is considered desirable for refining soda-lime-silica glass, but when vacuum is employed to assist refining, lower peak refining temperatures may be used without sacrificing product quality. The amount by which temperatures can be reduced depends upon the degree of vacuum. Therefore, when refining is to be performed under vacuum in accordance with the present invention, the glass temperature need be raised to no more than 2700° F. (1480° C.), for example, preferably no more than 2600° F. (1430° C.), and optimally no more than 2500° F. (1370° C.) prior to refining. Peak temperature reductions on this order result in significantly longer life for refractory vessels as well as energy savings. Combustion heat sources could be used in the vessel 10, but it has been found that this stage lends itself well to electric heating, whereby a plurality of electrodes 11 may be provided as shown in the figure extending horizontally through the sidewalls. Heat is generated by the resistance of the melt itself to electric current passing between electrodes in the technique conventionally employed to electrically melt glass. The electrodes 11 may be carbon or molybdenum of a type well known to those of skill in the art.

A valve controlling the flow of material from the melting vessel 10 to the refining stage 12 to comprised of a plunger 15 axially aligned with a drain tube 16. The shaft 17 of the plunger extends through the roof of the vessel 10 so as to permit control over the gap between the plunger 15 and the tube 16 to thereby modulate the rate of flow of material into the refining stage. The valve tube 16 may be fabricated of a refractory metal such as platinum and is fitted into an orifice at the upper end of the refining vessel, preferably in the roof 18 of the refiner, but a side wall location may also be feasible.

The refining stage 12 preferably consists of a vertically upright vessel that may be generally cylindrical in configuration, preferably with an enlarged upper portion to provide additional volume to contain the foam, and having an interior ceramic refractory lining 20 shrouded in a gas-tight water-cooled casing. The casing may include a double walled, cylindrical sidewall members 21 and 22 having annular water passageways, and circular end coolers 23 and 24. The roof 18 may be slightly domed for structural integrity and may also be provided with a fitted cooler 25. Any suitable cooling arrangement may be employed. A layer of insulation (not shown) may be provided between the lining 20 and the cooling jackets.

As the molten material passes through the tube 16 and encounters the reduced pressure within the refining vessel, gases included in the melt expand in volume, creating a foam layer 20 resting on a body of liquid 31. As foam collapses it is incorporated into the liquid body 31. Subatmospheric pressure may be established within the refining vessel through a vacuum conduit 32 extending through the upper portion of the vessel. Optionally, a burner 33 may be provided to heat the upper portion of the vessel interior. Introducing the melt at or near the top of the vacuum vessel is preferred because it places the incoming, actively foaming material having the greatest gas content above the other material in the vessel, where the thin foam membranes are exposed to the lowest pressure and the gases escaping from bursting bubbles are most free to escape into the headspace. For the purposes of the present invention, however, use of the burner 33 is preferably minimized in order to maintain the partial pressure of water vapor low in the headspace in order to drive more of the water out of solution in the melt.

Refined molten material is drained from the bottom of the refining vessel 12 by way of a drain tube 35 of a refractory metal such as platinum. The drain tube 35 preferably extends above the surface of the refractory bottom within which it is mounted to prevent any debris from entering the output stream. Leakage around the tube may be prevented by a water cooler 37 affixed to the bottom cooling jacket 24. The flow rate of molten material from the drain tube 35 may be controlled by a conical throttle member 38 carried at the end of a stem 39. The steam 39 is associated with mechanical means (not shown) to adjust the elevation of the throttle member 38 and thus adjust the gap between the throttle member and the tube 35 so as to control the flow rate therefrom. A molten stream 40 of refined material falls freely from the bottom of the refining vessel and may be passed to a forming station (not shown) where it may be shaped to the desired product. Refined glass, for example, may be passed to a float glass forming chamber where the molten glass floats on a pool of molten metal to form a flat sheet of glass.

The height of molten material 31 retained in the refiner 12 is dictated by the level of vacuum imposed in the chamber. The pressure head due to the height of the liquid must be sufficient to establish a pressure equal to or greater than atmospheric at the outlet to permit the material to drain freely from the vessel. The height will depend upon the specific gravity of the molten material, which for soda-lime-silica glass at the temperatures involved is about 2.3. A height in excess of the minimum required to offset the vacuum may be desired to account for fluctuations in atmospheric pressure, to permit variation of the vacuum, and to assure steady flow through the outlet. In the preferred embodiments of the present invention, a substantial excess height is provided so that the outlet flow rate is not determined by the vacuum pressure, but rather by mechanical valve means. Such an arrangement permits the throughput rate and the vacuum pressure to be varied independently of each other. Alternatively, the pressure at the outlet could be below atmospheric if the outlet is provided with pump means to overcome the pressure differential. An example of a pump that is intended for use with molten glass is disclosed in U.S. Pat. No. 4,083,711.

The benefits of vacuum on the refining process are attained by degrees; the lower the pressure, the greater the benefit. Small reductions in pressure below atmospheric may yield small improvements, but to economically justify the vacuum chamber the use of substantially reduced pressure is preferred. Thus, a pressure of no more than one-half atmosphere is preferred for appreciable refining improvements to be imparted to soda-lime-silica glass. Flat glass quality standards generally require absolute pressures less than 100 torr. To optimize the foam enhancement of the present invention, absolute pressures less than 50 torr are preferred. A typical range for float glass quality is 20 to 40 torr. A measure of the degree of refining is the number and size of gaseous seeds remaining in the product glass. The maximum number of seeds allowed varies according to the intended use of the product, but an example of a high quality level sometimes required for commercial float glass is about one seed per 1,000 to 10,000 cubic centimeters. Seeds less than 0.01 millimeter in diameter are considered imperceptible and are not included in the seed counts. Other products may permit ten times as many seeds or more.

It is the primary objective of this invention to increase the volume expansion of the material upon foaming. Extending the expansion of the foam has also been found to expedite its collapse, which is desirable for the sake of maintaining a manageable height of foam within the refining vessel. However, it may be preferred to use auxiliary foam breaking means to suppress accumulation of foam, particularly at the higher volume expansion ratios. To this end, it may optionally be desirable to use the techniques disclosed in U.S. Pat. No. 4,794,860. In the preferred embodiment, a conduit may extend into the vacuum vessel for introducing foam-breaking agents such as water into contact with the foam. In the drawing, there is shown an arrangement for injecting the water or other foam-breaking liquid into the refining vessel 12 wherein a tube 41 carrying the liquid terminates within the foam layer 30. The tube 41 may extend into the foam from above or may extend substantially horizontally from an opening in the side wall of the vessel 12 at an appropriate elevation as shown in the figure. The tube 41 may be provided with a water-cooled jacket to enhance its preservation. The pressure difference between the interior and exterior of the vessel will draw the liquid into the vessel.

Another foam-breaking technique that may optionally be employed in conjunction with the present invention is to periodically impose a sudden pressure change on the refining vessel interior. This may take the form of a pulse of reduced pressure from an auxiliary vacuum source. Alternatively, pulses of higher pressure may be provided by periodically opening the refining vessel interior to atmospheric pressure.

The foaming of the molten material as it enters the vacuum refining vessel is caused by enlargement of bubbles and gaseous seeds present in the melt and by relatively volatile substances coming out of solution. Any substance in the molten glass that is in the gas phase or comes out of solution under the conditions of the vacuum refining chamber will contribute to the expansion upon foaming. The bubbles and seeds that refining is intended to eliminate usually include nitrogen, carbon dioxide, and $SO_3$, but the foaming effects of the nitrogen and carbon dioxide appear to be far less significant than the $SO_3$. Commercial soda-lime-silica glass typically contains about 0.02 to 0.04 percent by weight water, which is insufficient for water to serve as the major foaming agent. For a given weight percent extracted from the melt, water has a greater volume expansion than does $SO_3$, but the amount of $SO_3$ and other volatiles (such as halogens) present in the melt may be taken into account when calculating by the ideal gas law the amount of additional water needed to yield a desired foam expansion ratio. Some of the gas-producing constituents will remain dissolved or will become redissolved in the product glass, and this must also be taken into consideration when calculating the volume expansion during foaming. About 75 to 90 percent of the $SO_3$ will be extracted from the melt under the preferred vacuum refining conditions, but only about 40 to 50 percent of the water will be removed under the same conditions due to its high solubility. For the foaming agents that remain in the glass after refining, solubility is an important consideration to assure that any residual seeds are reabsorbed into the glass and that a gaseous phase is not formed subsequently, and water is highly advantageous in this regard.

By way of example, a water concentration of 0.05 percent alone might yield marginal results under some conditions, but in combination with an $SO_3$ concentration of 0.03 percent by weight can improve refining performance. At a glass temperature of 2600° F. and a pressure of 25 torr in the refiner, water alone may provide sufficient foaming at concentrations in excess of 0.07 percent by weight.

The mechanisms for increasing the water content of the glass may involve the introduction of water at the vessel 10 shown in the drawing. The water may be introduced as steam or as a liquid, in which case the liquid is rapidly converted to steam upon entering the high temperature environment in the vessel 10. Water or steam may be injected through the bottom of vessel 10 in the manner shown in U.S. Pat. No. 2,331,052, or by means of a tube extending into the melt from above. In order to avoid cooling the melt, it may be desirable to inject the water vapor as a product of combustion from a submerged burner, particularly if the burner is fired with hydrogen and oxygen. Alternatively, the water need not be injected directly into the melt, but rather the water concentration in the space above the melt in vessel 10 may be maintained high, preferably saturated. Typical soda-lime-silica glass is saturated with water at a concentration of about 0.11 percent by weight at the temperatures involved. The presence of water in glass is essentially equivalent to the presence of hydroxyl ions. Therefore, water concentration can be raised by supplying hydroxides to the molten glass, either as additives at a location such as vessel 10, or as batch ingredients in the initial melting step. For example, the batch formula may be altered to supply a greater portion of the sodium from caustic soda rather than soda ash. The batch may be wetted with caustic soda solutions or aqueous sodium silicate. The use of organic compounds such as alcohols or glycols is also comtemplated.

Other variations as would be known to those of skill in the art may be resorted to within the scope of the present invention as defined by the claims that follow.

We claim:

1. In a method of refining glassy material wherein batch material is melted and a stream of the resulting molten material is foamed as it passes into a vessel in which subatmospheric pressure is maintained to remove gases from the molten material, the improvement comprising increasing the foaming by controlling the amount of water to at least 0.05 percent by weight in the molten material upstream from the foaming step so that vaporization of water in the subatmospheric pressure vessel enhances volume expansion during the foaming, whereby removal of gases from the molten material is increased.

2. The method of claim 1 wherein the water content of the molten material entering the vessel is at least 0.06 percent by weight.

3. The method of claim 1 wherein the water content of the molten material entering the vessel is at least 0.07 percent by weight.

4. The method of claim 1 wherein the weight percentage of water in the molten material decreases by at least 0.035 during passage of the molten material through the vessel.

5. In a method of refining glassy material wherein batch material is melted and a stream of the resulting molten material is foamed as it passes into a vessel in which subatmospheric pressure is maintained to remove gases from the molten material, the improvement comprising adding water to the molten material after melting and before foaming to increase the water concentration of the molten material entering the subatmospheric vessel so that vaporization of water in the subatmospheric pressure vessel enhances volume expansion of the foam, whereby removal of the gases from the molten material is increased.

6. The method of claim 5 wherein the water content is increased by injecting steam into a body of the molten glass.

7. The method of claim 5 wherein the water content is increased by maintaining an elevated partial pressure of water over a body of the molten glass.

8. The method of claim 5 wherein the water content is increased by adding to the molten glass material having a substantial hydroxyl group content.

9. The method of claim 8 wherein the material added to the glass is selected from the group of caustic soda and aqueous sodium silicate.

10. In a method of refining glassy material wherein batch material is melted and a stream of the resulting molten material is foamed as it passes into a vessel in which subatmospheric pressure is maintained to remove gases from the molten material, the improvement comprising increasing the volume expansion during the foaming by controlling the amount of water in the molten material upstream from the foaming step so that extraction of water from the molten material by the subatmospheric pressure decreases the water concentration of the molten material by a difference of at least 0.035 percent by weight, whereby removal of the gases from the molten material is increased.

* * * * *